INVENTOR.
Edwin Durham
BY
ATTORNEY

Feb. 13, 1962  E. DURHAM  3,020,895
HIGH TEMPERATURE FLUID HEATER
Filed Oct. 6, 1959

INVENTOR.
Edwin Durham
BY
ATTORNEY 3,020,895
HIGH TEMPERATURE FLUID HEATER
Edwin Durham, Wadsworth, Ohio, assignor to The Babcock & Wilcox Company, New York, N.Y., a corporation of New Jersey
Filed Oct. 6, 1959, Ser. No. 844,707
3 Claims. (Cl. 122—235)

The present invention relates to a high temperature fluid heater, and more particularly to a forced flow fluid heater for high temperature and high pressure water.

In space heating and for some process heating purposes the use of high pressure hot water is economically desirable, particularly in an operating pressure range of from 50 to 450 lbs. per square inch, gage, where the corresponding temperature range lies between 200–450° F. The unit for heating the water is fuel fired and may be of the forced flow type where the circulating pump or pumps for the heating system may be used to effect the forced flow of water through the heating unit. In heating the water the fuel is burned in a furnace enclosure wherein the heat is largely transmitted by radiation to heat absorbing surfaces which are cooled by the water being heated. Thereafter the partially cooled gases of combustion are passed through a gas-pass wherein the heat is transmitted predominately by convection heat exchange to heat absorbing surfaces to further heat the water. In such a heating unit it is necessary to arrange the water flow circuits so as to effectively and efficiently absorb the heat generated by the fuel combustion, and to regulate the flow of water in the circuits so that the heat absorbing surfaces will be protected against overheating during all conditions of operation.

In this invention a hot water heating unit is provided wherein the heat absorbing elements consist of tubes arranged in the walls of the furnace and in the walls of a flow connected gas-pass, with other tubes positioned in the gas flow path within the convection gas-pass. The tubes of the unit are serially connected in groups, with the tubes in each group arranged for parallel water flow. The various groups are connected by unheated supply tubes or downcomers for series flow of water therethrough. Preferably the water flow path through the unit includes a row of tubes arranged for parallel flow of water therethrough, where the tubes of the row are partly exposed to high intensity heating by radiation heat from the fuel combustion, and partly exposed to relatively low intensity heating by predominantly convection heating effects. The partly heated water is thereafter delivered by serial flow to a bank of convection heating tubes. It is then directed by external unheated downcomers to lower headers which feed the water to other tube rows where the heating process continues by exposure to at least some high intensity heating. In the construction hereinafter described the heating water is so distributed to the various heat absorbing surfaces that unequal heating of the tubes in the parallel flow circuits is compensated by a proportionate distribution of water so that no tube or portion of a tube group becomes overheated.

The various features of novelty which characterize my invention are pointed out with particularity in the claims annexed to and forming part of this specification. For a better understanding of the invention, its operating advantages and specific objects attained by its use, reference should be had to the accompanying drawings and descriptive matter in which I have illustrated and described a preferred embodiment of the invention.

Figure 1:
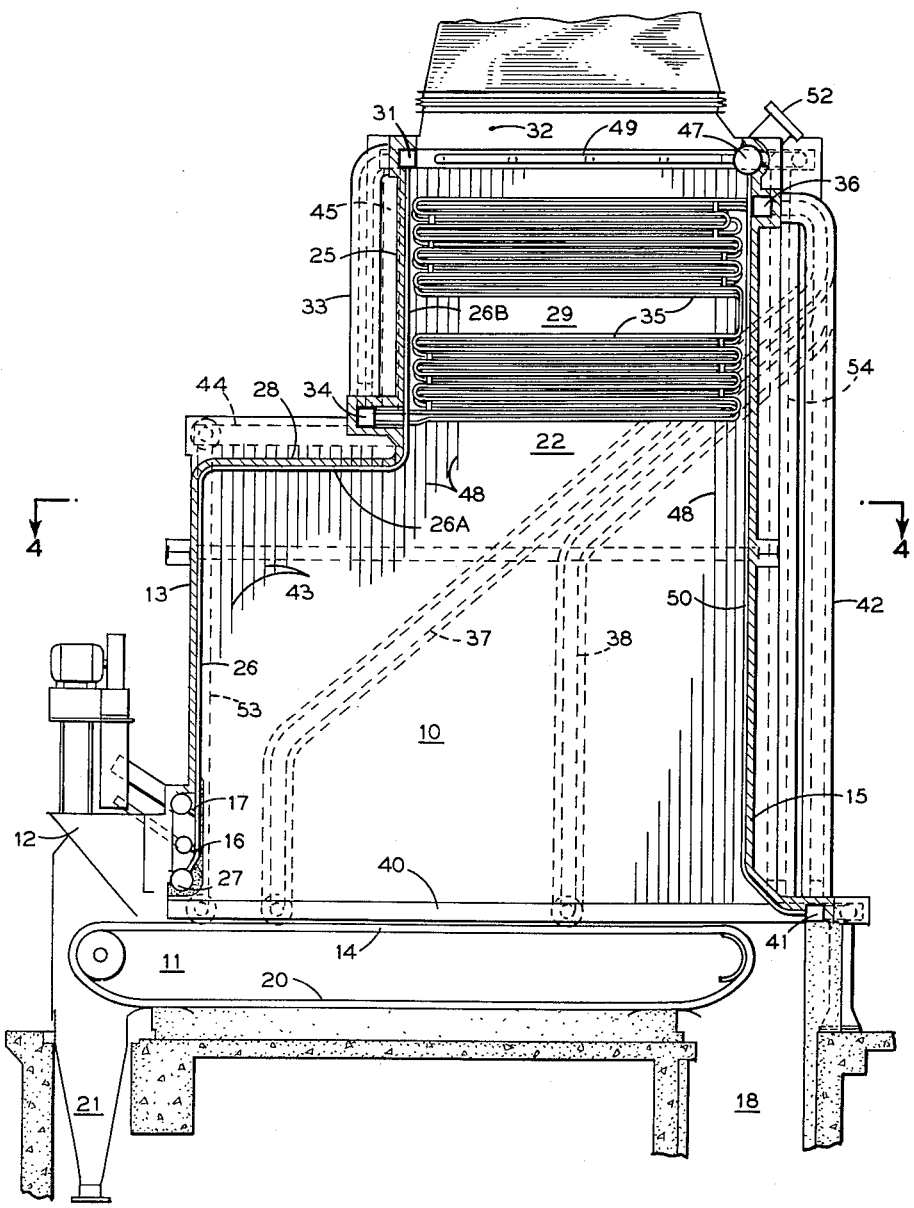
FIG. 1 is a section elevation of a hot water generator constructed and arranged according to the present invention.

As disclosed in the drawings the fluid heater includes a furnace 10 constructed and arranged for the combustion of solid fuel. A jet-ignition stoker 11 of the type disclosed in U.S. Patent 2,876,716, is positioned in the lower portion of the furnace where the fuel is introduced through the hopper 12 adjacent the front wall 13 of the furnace. The fuel is ignited and burned on a traveling grate 14 which moves across the lower portion of the furnace from the front wall 13 toward the rear wall 15. The fuel is supplied with over-fire air discharged through nozzles 16 and 17 which are arranged to discharge through the front wall 13 of the furnace. The non-combustible constituents of the solid fuel are discharged from the rear of the traveling grate 14 into an ash pit 18 positioned at the rear of and below the furnace. Any solid fuel siftings which may pass through the fuel supporting surface of the grate 14 will be transported by the lower run 20 of the grate for discharge into a sifting hopper 21 positioned adjacent the front wall 13 of the furnace.

The hot gaseous products resulting from the combustion of the solid fuel leave the furnace 10 through a gas outlet 22 bounded on three sides by the rear wall 15 and side walls 23 and 24 of the furnace, and on the front by a wall 25 spaced rearwardly of the front wall 13 and opening upwardly into an associated vertically extending convection gas-pass 29. As hereinafter described the walls of the furnace and of the convection gas-pass each include a row of water heating tubes. The tubes absorb the heat from the gaseous combustion products and protect the walls of the unit from the adverse effects of high temperature combustion.

Figure 3:
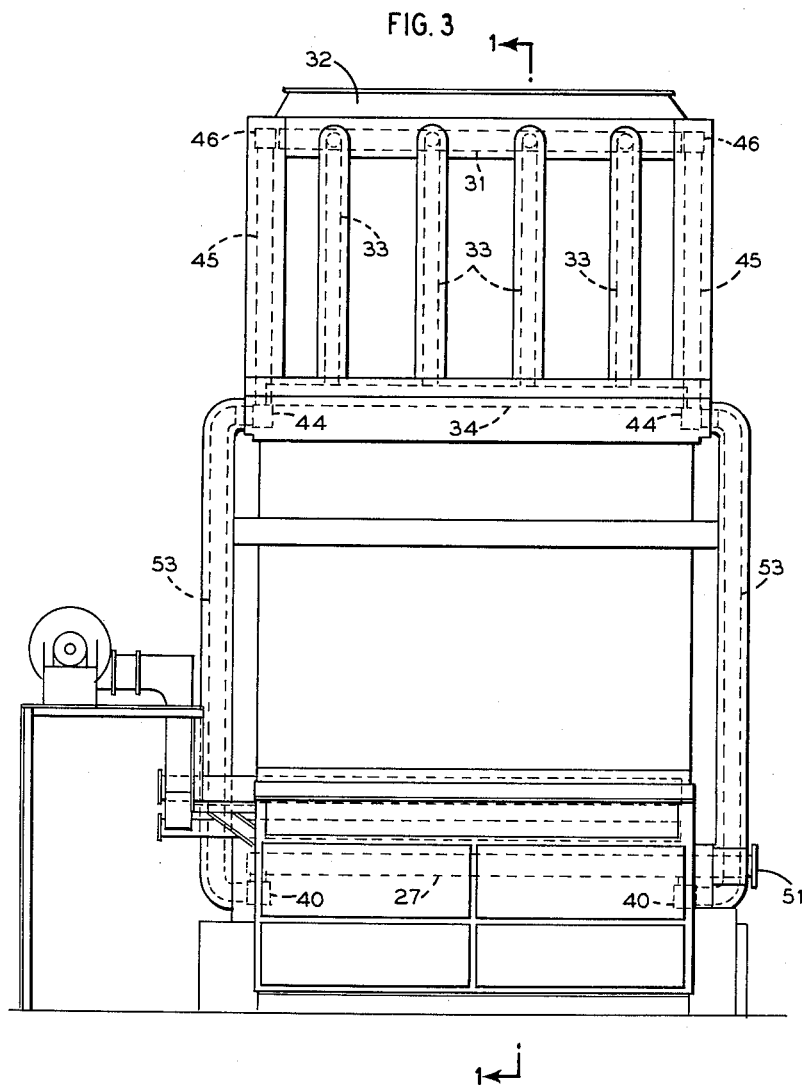
FIG. 3 is an elevation of the front wall of the generator shown in FIG. 1.

As shown in FIG. 1 the front wall 13 of the unit is provided with an upright row of tubes 26 having their lower ends opening to a transversely extending externally positioned inlet header 27. The header is positioned upwardly adjacent the upper surface 14 of the traveling grate of the stoker 11 and is arranged to receive incoming water through inlet 51 (see FIG. 3) to be heated in the unit. In the usual arrangement the circulating pump (not shown) used to distribute water to the heating system served by the unit is positioned to discharge relatively cool water into the inlet header 27. An intermediate portion 26A of the tubes 26 is bent in a horizontal direction to extend toward the rear wall of the furnace and thus form, in part, the roof 28 of the furnace. The upper portion 26B of the tubes 26 extend upwardly along the front wall 25 of the convection gas-pass 29 to discharge into an upper header 31 which is positioned in the wall 25 of the convection gas-pass.

With the construction described the incoming water is subject to high intensity heat throughout the lower and intermediate portion of the front wall tubes 26, while the upper portion 26B of the tubes is exposed to relatively low intensity, predominantly convection heating from the gas moving upwardly through the gas-pass 29 to the gas outlet 32.

The partially heated water delivered to the upper header 31 is directed through external downcomers 33 to a transversely extending intermediate header 34 positioned upwardly adjacent the roof 28 of the furnace and outwardly of the front wall 25 of the convection gas-pass. The water discharged into the header 34 is passed through a bank of convection tubes 35 extending across the convection gas-pass 29. The convection tubes 35 are of the return bend type arranged to extend horizontally across the gas-pass 29. The discharge ends of the convection bank tubes open into a header 36 located adjacent the gas-pass at the top of rear wall 15. The rear wall of the furnace extends to form the rear wall of the convection gas-pass, with both portions lying in a common upright plane. The convection tubes 35 are supported in a conventional manner from the walls of the convection gas-pass. Suitable hangers are utilized to permit guided relative movement between the adjacent lengths of the return bend tube formation.

The water delivered to the upper rear wall header 36 is passed through downcomers 37 and 38 to horizontally positioned longitudinal headers 40 positioned in the side walls 23 and 24 of the furnace upwardly adjacent the level of the stoker grate 14. In the illustrated embodiment of the invention the side walls of the furnace are each provided with a lower longitudinal header 40. The rear wall 15 is provided with a transverse header 41 which extends between the side wall headers 40 and is at substantially the same elevation as the sidewall headers. Water is supplied to the header 41 through downcomers 42 from header 36.

Figure 2:
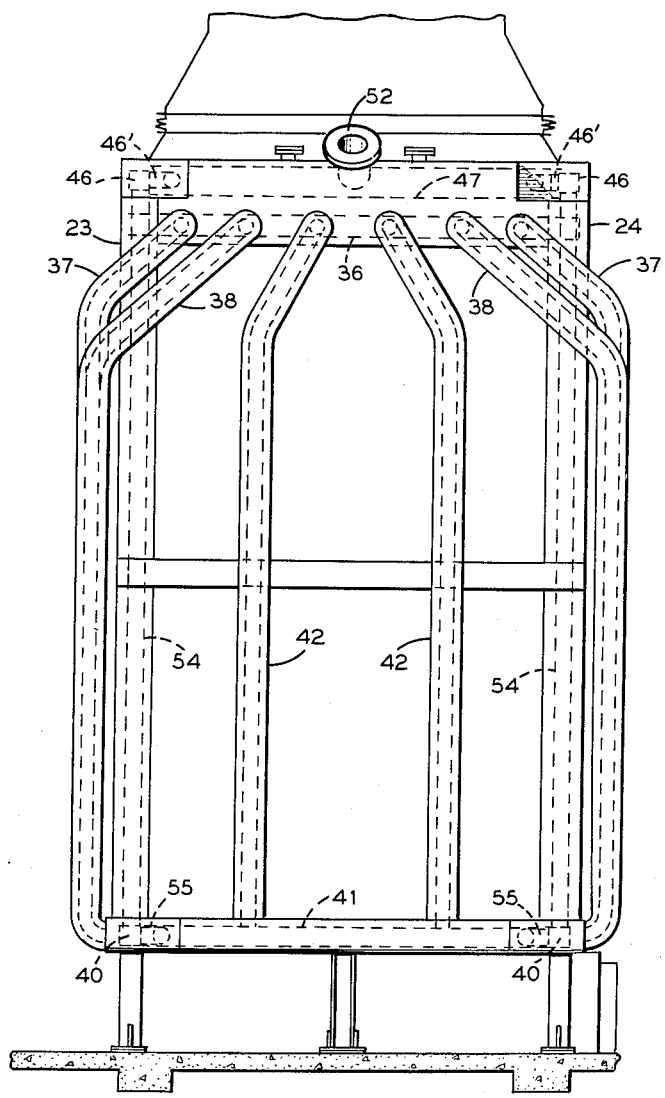
FIG. 2 is an elevation of the rear wall of the generator shown in FIG. 1.
Figure 4:
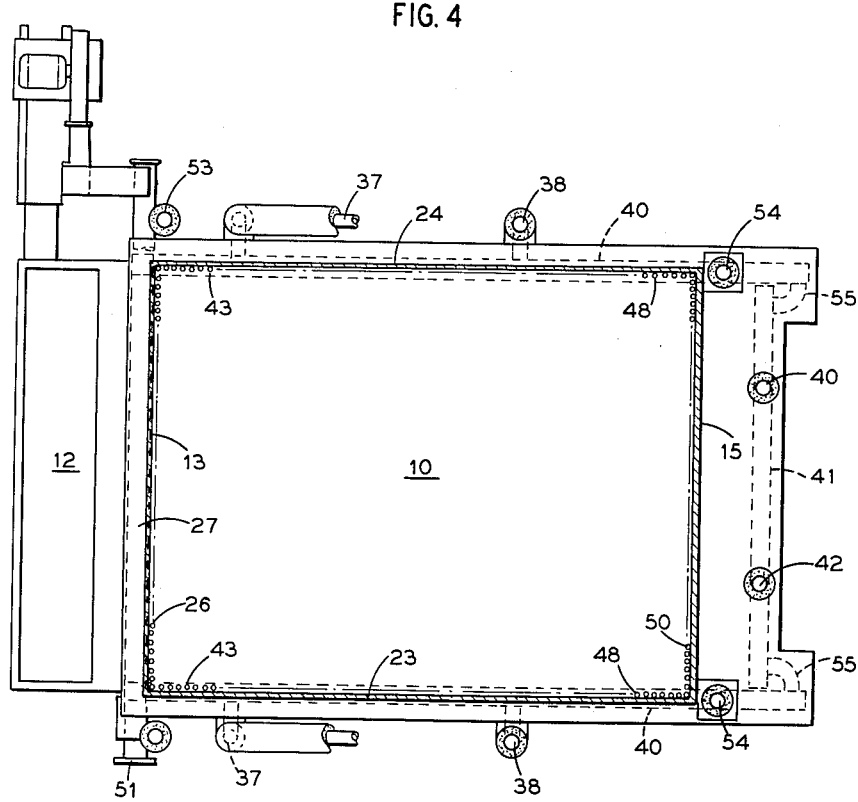
FIG. 4 is a section taken on line 4—4 of FIG. 1.

As shown in FIGS. 1 and 2 the side wall downcomers 37 and 38 are spaced longitudinally of the furnace 10 so as to distribute the water supply to each of the headers 40 and thence to the side wall tubes. As shown in FIGS. 2 and 4 the lower rear wall header 41 is connected adjacent its ends with elbow fittings 55 opening to the adjoining side wall headers 40. With this construction the distribution of water to the lower headers 40 and 41 will be equalized so that the tubes in the side and rear walls of the furnace will each receive an adequate supply of water.

Since the horizontal cross-sectional area of the convection gas-pass 29 is less than the horizontal cross-sectional area of the furnace 10 some of the side wall tubes 43 will extend only to an intermediate longitudinal header 44 positioned on each side of the furnace above the roof 28. Each intermediate header 44 receives the water heated in the side wall tubes 43 of the furnace, with the water thereafter passed upwardly through a riser 45 positioned at the convection pass end of each of the intermediate headers. Each riser 45 opens to the end of an upper side wall header 46 located on each side of the convection gas-pass outlet.

The remaining tubes 48 in the furnace side walls extend upwardly throughout the height of the furnace and the convection gas-pass to discharge directly into the upper side wall headers 46. The upper side wall headers are directly connected by elbow fittings 46' (see FIG. 2) with an upper transversely positioned hot water collecting header 47 positioned at the top of rear wall 15 adjacent the convection gas-pass outlet 32. The side wall headers 46 are also connected by circulators 49 with the header 47. A row of rear wall tubes 50 directly connects the lower rear wall header 41 with the header 47, with portions of the tubes 50 forming both the furnace and convection gas-pass rear wall 15.

While the described flow circuit for the water to be heated proceeds from the flanged inlet connection 51, through heated flow paths, i.e. tubes 26, 35, 43, 48 and 50 to the hot water outlet connection 52, the unit is provided with additional upright headers to serve as standpipes or reservoirs to provide water for maintaining flow through the unit in the event of forced flow pump failure. A standpipe or vertical header 53 connects the front wall end of each of the headers 40 with the front wall end of each of the intermediate headers 44, while the opposite or rear wall end of each header 40 is connected with the rear wall end of headers 46 by a standpipe or vertical header 54.

In the operation of the unit described, the water return from the heating system enters the header 27 and passes upwardly in parallel flow through the tubes 26 to the header 31. The combustion of fuel in the furnace 10 produces high temperature gases which radiate heat to the walls of the furnace, so that the tubes 26, particularly in the lower portion and in the roof portion, will receive comparatively high intensity radiation, thereby transmitting heat to the water passing through the tubes. It is of course understood that the fuel burned in the furnace 10 may be solid, liquid or gaseous and the solid fuel may be burned by means other than that shown in the embodiment of the invention. The water entering the header 31 passes downwardly through the downcomers 33 to the header 34 and thereafter passes through the rows of tubes in the convection bank 35 for delivery to the header 36. In leaving the header 36 the water passes downwardly through the downcomers 37, and 38, and 42, for delivery to the lower headers 40 and 41 respectively. These lower headers are also interconnected by elbow fittings 55 to assure proper distribution of the water to the inlet of the tubes 43, 48 and 50 in the side and rear walls of the unit.

The water in passing through the side and rear wall tubes is heated by exposure to the hot gases of combustion generated in the furnace. The heated water in the forward portion of the furnace side wall is collected in the headers 44, while the water heated in the remaining tubes in the side walls and in the rear walls is delivered to the upper side wall headers 46 and the collecting header 47, respectively. The headers 44 and the upper side wall headers 46 are interconnected by the vertical tubes 45 so that all of the heated water discharged from the side wall tubes is delivered to the headers 46 for collection in the header 47 by the circulation 48 and elbows 46'. The rear wall tubes 50 discharge directly to the header 47 for discharge of the collected water through the outlet connection 52.

In the event that the circulating pump delivering water to the inlet connection 51 becomes inoperative momentarily for any reason whatsoever, the unit is provided with means for promoting natural circulation of water through the wall tubes to protect the unit from tube failure. This is accomplished by use of the standpipes 53 and 54 which interconnect the side wall and rear wall headers. Thus if the delivery of water to the unit ceases, the water in the standpipes will circulate to the wall tubes by thermo-siphonic action. The lower density of the fluid in the heated wall tubes will cause the heavier density water in the standpipes 53 and 54 to cause circulation of water to the inlet ends of the wall tubes. This use of the standpipes will be sufficient to protect the unit for a limited period of time.

While in accordance with the provisions of the statutes, I have illustrated and described herein the best form and mode of operation of the invention now known to me, those skilled in the art will understand that changes may be made in the form of the apparatus disclosed without departing from the spirit of the invention covered by my claims, and that certain features of my invention may sometimes be used to advantage without a corresponding use of other features.

What is claimed is:

1. A hot water heater comprising means including tubes defining the front, rear and side walls of a furnace having a top outlet for heating gases, means including tubes defining the front, rear and side walls of an upright convection gas-pass positioned upon and opening directly to the furnace gas outlet, means for burning fuel in said furnace, an inlet header positioned adjacent the front wall of said furnace and opening to the inlet ends of a row of tubes in the front wall of said furnace, said row of tubes being extended across the roof portion of said furnace and extended upwardly along the front wall portion of said convection gas-pass, an outlet header positioned adjacent the upper portion of the front wall of said convection gas-pass, means for passing water in parallel through said row of tubes from said inlet to said outlet header, rows of reverse bend convection heating tubes positioned in said convection gas-pass, means for passing partially heated water from said front wall outlet header to the lower end of said convection heating tubes for flow therethrough and further heating of said water, means for passing said partially heated water from said convection heating tubes to the lower ends of the tubes of said side and rear walls for parallel upward flow of water therethrough, headers positioned above the roof of said furnace to receive the heated water discharged from the side wall tubes in the forward portion of said furnace, upper horizontally extending headers positioned adjacent the upper end of the side and rear walls of said convection gas-pass to receive the heated water discharged from the remaining side wall tubes and said rear wall tubes, means connecting said roof headers with said upper headers for the collection of hot water from all of said side and rear wall tubes, and means defining a hot water discharge outlet from said upper headers.

2. A hot water heater comprising walls defining the front, rear and sides of a furnace and an upright convection gas pass positioned above and opening at its lower end directly to the furnace, means for burning fuel in said furnace, a row of water tubes extending upwardly along the front wall of said furnace and upwardly along the front wall of said convection gas pass, a bank of horizontally arranged convection heated water tubes positioned in said convection gas pass below the upper end of said front wall tubes, external downcomers for passing partially heated water from the upper end of said front wall tubes to the lower end of said convection heating tubes for upward flow therethrough, vertically arranged water tubes extending along the side and rear walls of said furnace for parallel upward flow of water therethrough, and external downcomer means for conducting heated water from the upper end of the convection heated tubes in said gas pass to the lower ends of said furnace side and rear wall tubes, whereby a water flow is provided upwardly through all of the heated water tubes.

3. A hot water heater comprising walls defining the front, rear and sides of a furnace and a roof extending across one portion of said furnace, an upright convection gas pass positioned above and opening at its lower end directly to the other portion of the furnace, means for burning fuel in said furnace, a row of water tubes extending upwardly along the front wall and roof of said furnace and upwardly along the front wall of said convection gas pass, a bank of horizontally arranged convection heated water tubes positioned in said convection gas pass below the upper end of said front wall tubes, external downcomers for passing partially heated water from the upper end of said front wall tubes to the lower end of said convection heating tubes for upward flow therethrough, vertically arranged water tubes extending along the side and rear walls of said furnace for parallel upward flow of water therethrough, and external downcomer means for conducting heated water from the upper end of the convection heated tubes in said gas pass to the lower ends of said furnace side and rear wall tubes, whereby a water flow is provided upwardly through all of the heated water tubes.

References Cited in the file of this patent

UNITED STATES PATENTS

| | | |
|---|---|---|
| 2,860,612 | Durham | Nov. 18, 1958 |
| 2,904,016 | Durham | Sept. 15, 1959 |
| 2,907,306 | Stabenow | Oct. 6, 1959 |